(12) United States Patent
Liu

(10) Patent No.: US 12,337,206 B2
(45) Date of Patent: Jun. 24, 2025

(54) MULTIFUNCTIONAL ADJUSTABLE WEIGHTLIFTING EQUIPMENT

(71) Applicant: OHFG TECHNOLOGIES(SHANGHAI) CO., LTD, Shanghai (CN)

(72) Inventor: Ping Liu, Shanghai (CN)

(73) Assignee: OHFG TECHNOLOGIES (SHANGHAI) CO., LTD, Shanghai (CN)

( * ) Notice: Subject to any disclaimer, the term of this patent is extended or adjusted under 35 U.S.C. 154(b) by 108 days.

(21) Appl. No.: 18/298,489

(22) Filed: Apr. 11, 2023

(65) Prior Publication Data
US 2024/0299799 A1    Sep. 12, 2024

(30) Foreign Application Priority Data

Mar. 9, 2023  (CN) .......................... 202310234534.X

(51) Int. Cl.
*A63B 21/072* (2006.01)
*A63B 21/075* (2006.01)
*A63B 21/078* (2006.01)

(52) U.S. Cl.
CPC ........ *A63B 21/075* (2013.01); *A63B 21/0724* (2013.01); *A63B 21/0728* (2013.01); *A63B 21/0783* (2015.10)

(58) Field of Classification Search
None
See application file for complete search history.

(56) References Cited

U.S. PATENT DOCUMENTS

| | | | |
|---|---|---|---|
| 4,639,979 A * | 2/1987 | Polson | F16B 7/1418 285/373 |
| 5,591,109 A * | 1/1997 | Strnad | A63B 21/0728 24/524 |
| 7,513,856 B2 | 4/2009 | Jones | |
| D941,408 S * | 1/2022 | Jones | D21/694 |
| 11,324,986 B2 | 5/2022 | Kehlenbach et al. | |
| 11,565,143 B2 | 1/2023 | Jones | |
| 11,602,661 B2 * | 3/2023 | Svenberg | A63B 21/075 |
| 2003/0232704 A1 * | 12/2003 | Bowman | A63B 21/0728 482/106 |
| 2008/0026921 A1 * | 1/2008 | Liu | A63B 21/075 482/107 |
| 2008/0287271 A1 * | 11/2008 | Jones | F16B 2/10 482/107 |

(Continued)

FOREIGN PATENT DOCUMENTS

| | | | | |
|---|---|---|---|---|
| CN | 101151072 A | * | 3/2008 | ......... A63B 21/0728 |
| CN | 106039635 A | * | 10/2016 | ........... A63B 21/075 |

(Continued)

*Primary Examiner* — Shila Jalalzadeh Abyaneh

(57) ABSTRACT

Provided is multifunctional adjustable weightlifting equipment, including: a grip; a weight mounting assembly, configured to mount a weight stack; and a safety lock assembly, arranged between the grip and the weight mounting assembly, where one side of the safety lock assembly is fixedly connected to the weight mounting assembly, and an end part of the grip is in detachable clamping connection with the safety lock assembly. The safety lock assembly is arranged between the weight mounting assembly and the grip, so that the grip can be replaced rapidly.

12 Claims, 16 Drawing Sheets

(56) References Cited

U.S. PATENT DOCUMENTS

| | | | |
|---|---|---|---|
| 2010/0035736 A1* | 2/2010 | Crawford | A63B 21/0728 |
| | | | 482/107 |
| 2015/0360073 A1* | 12/2015 | Moran | A63B 21/075 |
| 2018/0117386 A1* | 5/2018 | Wang | A63B 71/0036 |
| 2020/0094100 A1* | 3/2020 | Garcia Castillo | A63B 21/0601 |
| 2020/0171339 A1* | 6/2020 | Jones | A63B 21/0728 |
| 2021/0339072 A1* | 11/2021 | Benoit | A63B 21/0728 |
| 2022/0143452 A1* | 5/2022 | Reed | A63B 21/0726 |
| 2022/0143453 A1* | 5/2022 | Martin | F16B 2/06 |

FOREIGN PATENT DOCUMENTS

| | | | | |
|---|---|---|---|---|
| DE | 202021002587 U1 | * | 10/2021 | |
| WO | WO-2015144955 A1 | * | 10/2015 | A63B 21/0724 |

* cited by examiner

MULTIFUNCTIONAL ADJUSTABLE WEIGHTLIFTING EQUIPMENT

TECHNICAL FIELD

The present invention relates to the field of fitness equipment, and in particular to multifunctional adjustable weightlifting equipment.

BACKGROUND

Weightlifting equipment is favored by many fitness enthusiasts. In different exercise stages, different types of weightlifting equipment are selected, the weight requirements are different, and grips of different weightlifting equipment are also different. For example, the grips have different lengths, and the grips of barbells include straight grips and curved grips. For the ordinary grip, weight stacks at two ends are directly mounted on two sides of the grip, it is necessary to sequentially remove the weight stacks during replacement, which is very inconvenient, and it is prone to injury during replacement. In addition, during weight adjustment, it is very inconvenient to adjust the weight stack, and there is a certain potential safety hazard in the adjusting process due to the heavy weight stack.

SUMMARY

An objective of the present invention is to provide multifunctional adjustable weightlifting equipment. A safety lock assembly is arranged in a grip and a weight mounting assembly, and the grip can be replaced safely and conveniently directly through the connection of the safety lock assembly and replacement of the grip; meanwhile, the weight stack mounting assembly achieves convenient weight adjustment without carrying the weight stack, which is convenient and safe.

To achieve the above objective, the present invention provides the following technical solution:

multifunctional adjustable weightlifting equipment includes a grip; a weight mounting assembly, configured to mount a weight stack; and a safety lock assembly, arranged between the grip and the weight mounting assembly, where one side of the safety lock assembly is fixedly connected to the weight mounting assembly, and an end part of the grip is in detachable clamping connection with the safety lock assembly.

Further, two ends of the grip are fixedly connected to connecting plates; and when the end part of the grip is in clamping connection with the safety lock assembly, the connecting plates are limited inside the safety lock assembly to prevent the end part of the grip from sliding out of the safety lock assembly.

Further, the safety lock assembly includes: a first fixing plate, where an open first fixing groove is formed at the middle position of the first fixing plate, and a lower end of the first fixing plate is hinged with the weight mounting assembly; a second fixing plate, where an open second fixing groove is formed at the middle position of the second fixing plate, the second fixing plate and the first fixing plate are mounted oppositely, a lower end of the second fixing plate is hinged with the weight mounting assembly in a limiting manner, and when the first fixing groove is directly opposite to the second fixing groove, a shape formed thereby is matched with a shape of an end part of a grip tube of the grip; and a locking device, where the locking device detachably connects an upper end of the first fixing plate with an upper end of the second fixing plate. When the locking device locks the upper ends of the first fixing plate and the second fixing plate, the first fixing groove and the second fixing groove clamp and limit a grip tube of the grip.

Further, the locking device includes a fixing piece and a wrench, one end of the fixing piece is hinged with the middle position of the wrench, a first lockpin is arranged at the other end of the fixing piece, and a second lockpin is arranged at one end of the wrench; a hook is arranged on a plate surface of an upper end of the first fixing plate, and a size of the hook is matched with that of the first lock pin, so that the hook is capable of being hitched with the first lockpin; and a mounting hole is formed in a plate surface of an upper end of the second fixing plate, and the second lockpin passes through the mounting hole and then hinges the wrench with the second fixing plate. The fixing piece and the wrench form a connecting rod structure. The wrench is wrenched to control the first lockpin to be in clamping connection or not in clamping connection with the hook.

Further, the safety lock assembly further includes a safety lock shell; the first fixing plate and the second fixing plate are mounted inside the safety lock shell; an open port is formed at an edge of the safety lock shell; and the upper ends of the first fixing plate and the second fixing plate pass through the open port. The locking device further includes a knob; the knob has two obtuse-angled edging strips; the knob is hinged with the wrench at an intersection point of the two edging strips; a clamping hook is arranged at an end part of the edging strip at a lower end of the knob; correspondingly, a clamping groove matched with the clamping hook is formed in a side wall of the safety lock shell; and when the clamping hook is in clamping connection with the clamping groove, the wrench is non-rotatable. The wrench is further limited through the clamping connection between the knob and the safety lock shell, thereby preventing the safety accident caused by the loose connection between the grip and the safety lock assembly due to the shaking of the wrench during use.

Further, a torsional spring is further mounted on the knob, the wrench is provided with an abutting groove corresponding to the mounting position of the torsional spring; and one end of the torsional spring abuts against the abutting groove, and the other end of the torsional spring abuts against an inner surface of a free end of the knob. When the clamping hook is in clamping connection with the clamping groove, the clamping hook performs abutting connection under the action of an elastic force of the torsional spring, so that the clamping hook and the clamping groove are kept in a clamping connection state, and the safety accident caused by unlocking due to touch by mistake can be avoided.

Further, the weight mounting assembly includes a rotating shaft; at least one cam mechanism is sleeved on the rotating shaft in a non-rotatable manner and configured to hitch the weight stack; the cam mechanism has several pairs of hitching parts and avoidance parts with different angles; a notch for accommodating the rotating shaft is formed in the middle of the weight stack; a cam groove is formed in a surface, located on an outer side of the notch, of one side of the weight stack; and an open clamping port is formed at an upper edge of the cam groove and configured to accommodate the cam mechanism and hitch the cam mechanism and the weight stack. When the rotating shaft is rotated at different angles, the corresponding cam mechanism can be hitched with the weight stack, thereby achieving weight adjustment of different weights.

Further, a maximum diameter width of each pair of hitching parts of the same cam mechanism is greater than a minimum width of the clamping port; and a maximum diameter width of each pair of avoidance parts is less than the minimum width of the clamping port.

Further, the cam mechanism includes a bearing layer for being hitched with the weight stack; wear-resistant layers are respectively arranged on two sides of the bearing layer; and the wear-resistant layers isolate the bearing layer of the cam mechanism from the weight stack, thereby effectively avoiding wear between the bearing layer and the weight stack.

Further, a connecting neck is fixedly connected or integrally formed at the center position of the wear-resistant layer on one side of the bearing layer, and a polygonal connecting protrusion is arranged at a free end of the connecting neck; and the wear-resistant layer on the other side of the bearing layer is provided with a connecting groove of which a shape and a size are matched with those of the connecting protrusion.

Further, a base is further included, where a bottom support is arranged on each of two ends of the base; two pairs of grip storage grooves are formed at the symmetrical positions of upper surfaces of the bottom supports on two sides and are configured to support two ends of the grip.

It can be seen from analysis that, according to the multifunctional adjustable weightlifting equipment, the safety lock assembly is arranged between the weight mounting assembly and the grip, so that the grip can be replaced rapidly, the replacement process is safe, the event that the weight stack falls or topples is avoided, and the use is safer; the locking device is arranged in the safety lock assembly, the wrench can be unlocked after the knob is pressed, and the position relationship between the first fixing plate and the second fixing plate is released by the wrench; the weight mounting assembly is provided with multiple pairs of hitching parts and avoidance parts with different angles, and the rotating shaft is rotated at different angles to hitch different numbers of weight stacks, so that weight adjustment is achieved, and the adjustment process is simple, convenient and very safe; the wear-resistant layers are arranged on two sides of the cam mechanism and can effectively avoid wear between the cam mechanism and the weight stack; and the grip storage groove is formed above the base and configured to store idle grips, thereby facilitating arrangement and storage.

BRIEF DESCRIPTION OF THE DRAWINGS

The drawings of the specification that constitutes a part of the present application are used to provide a further understanding of the present invention. The exemplary embodiments of the present invention and the description thereof are used to explain the present invention, and do not constitute an improper limitation of the present invention. In the drawings.

DESCRIPTION OF REFERENCE NUMERALS

Figure 1:
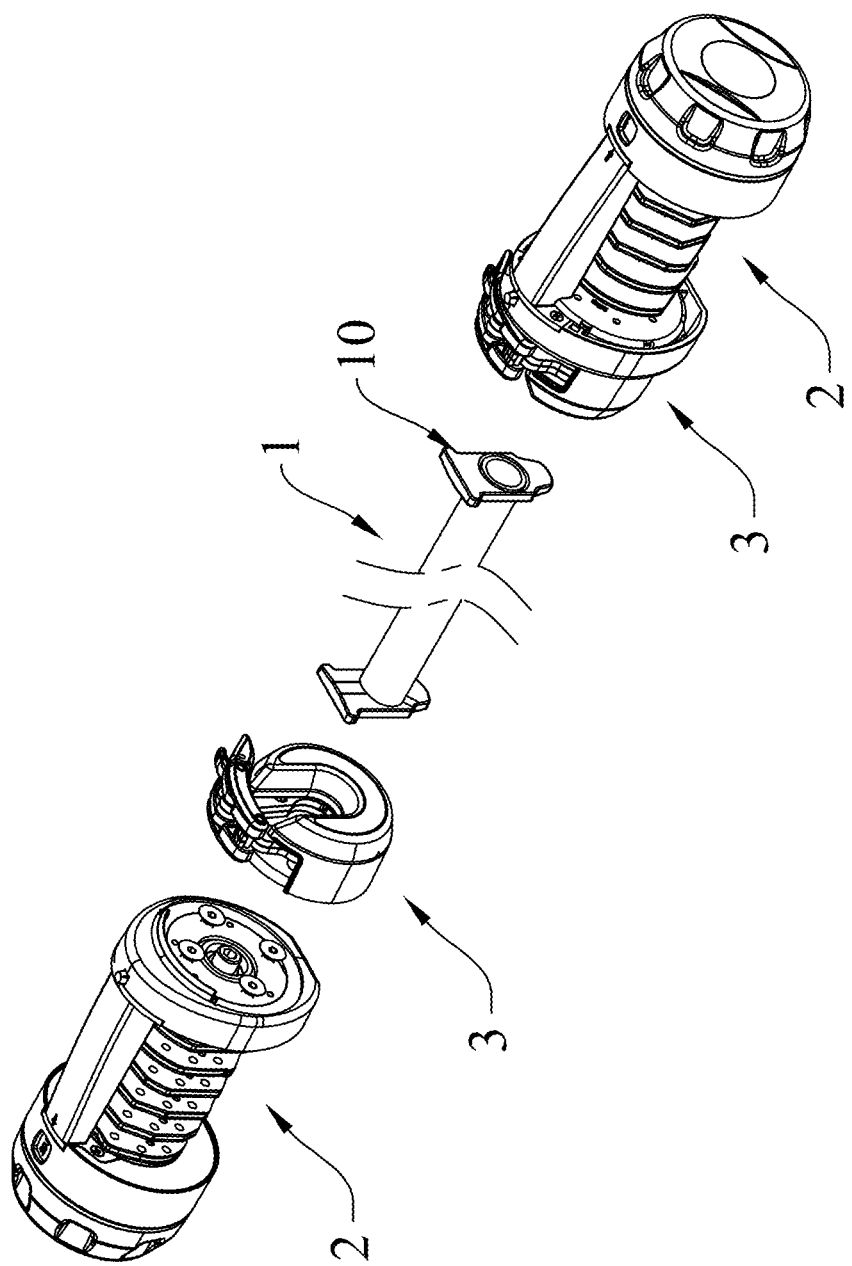
FIG. 1 is a schematic diagram of an exploded structure according to an embodiment.
Figure 2:
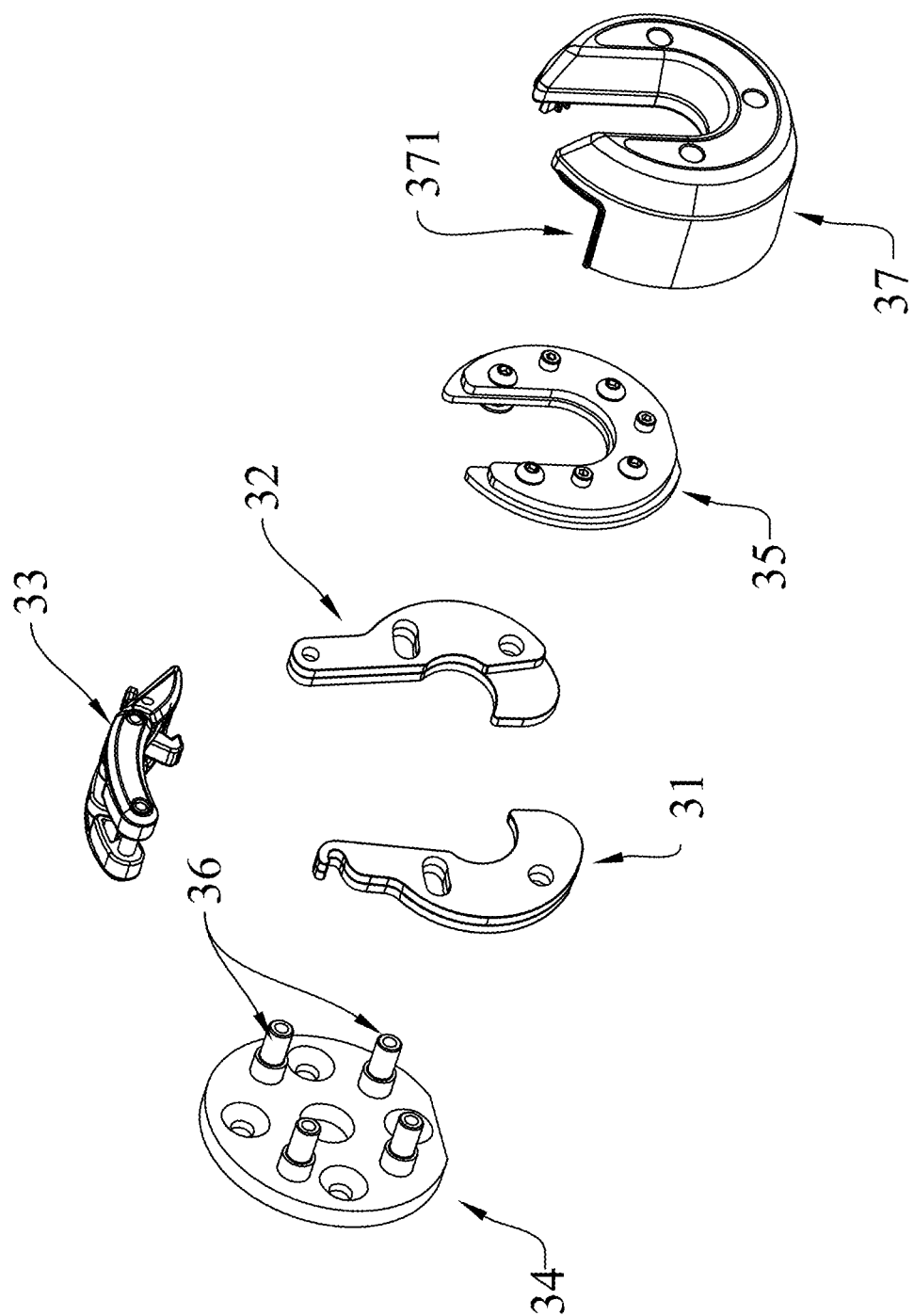
FIG. 2 is a schematic diagram of an exploded structure of a safety lock assembly according to an embodiment.
Figure 3:
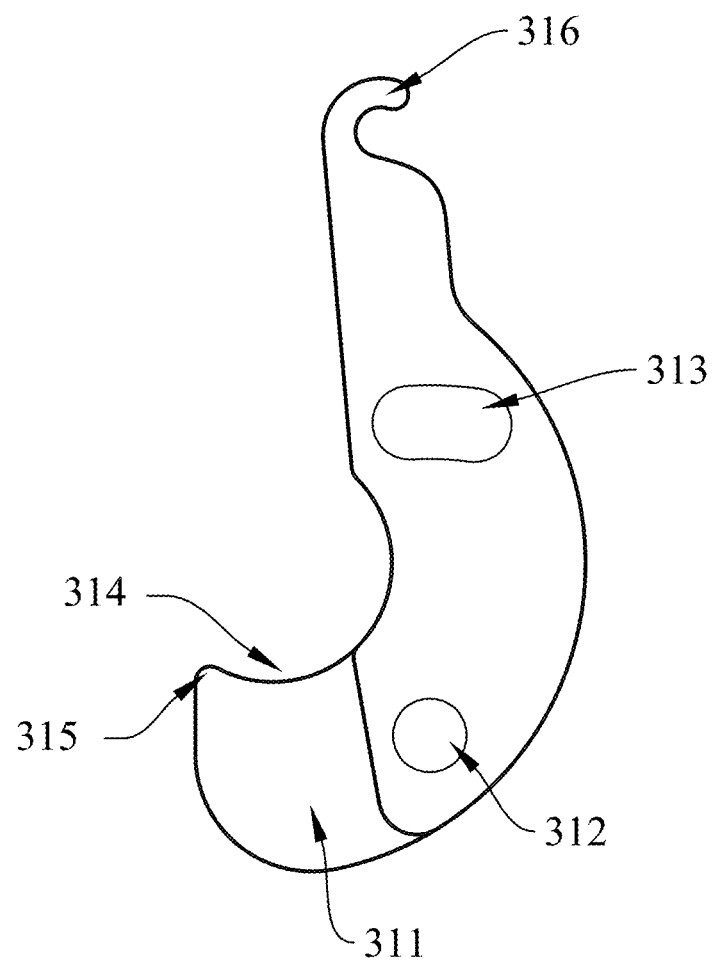
FIG. 3 is a structural schematic diagram of a first fixing plate according to an embodiment.
Figure 4:
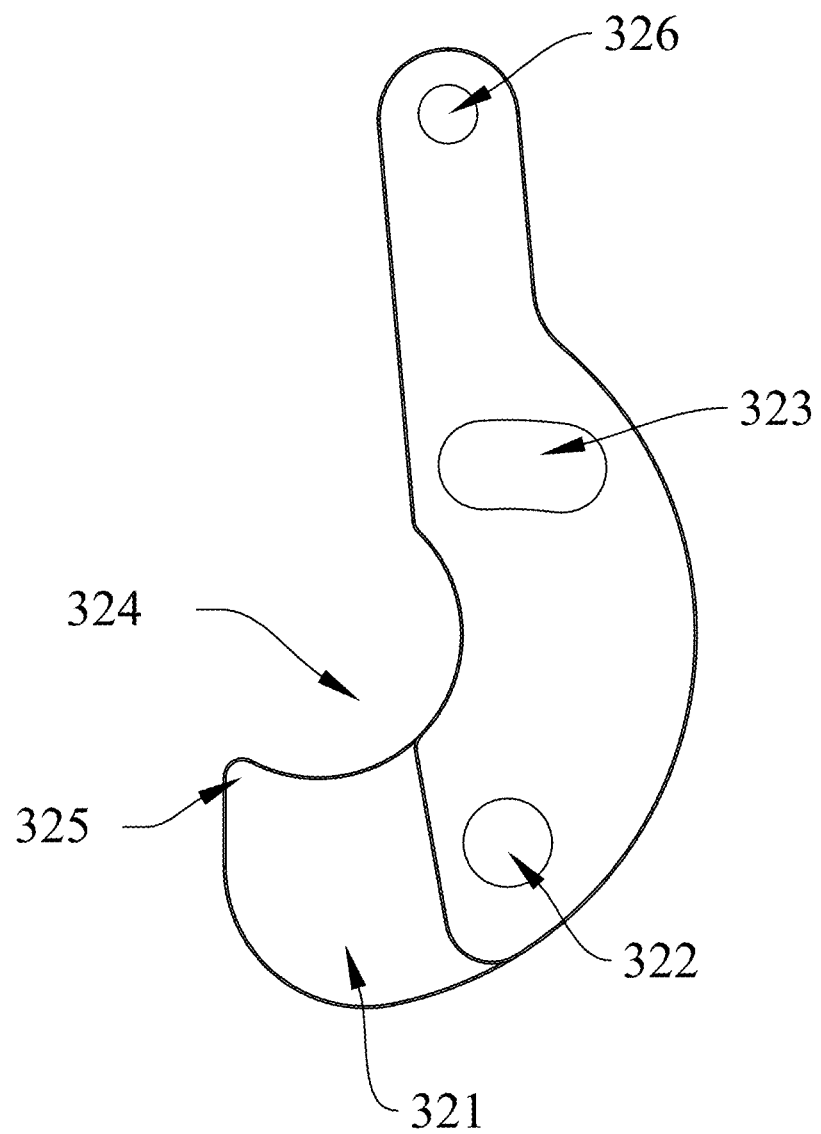
FIG. 4 is a structural schematic diagram of a second fixing plate according to an embodiment.
Figure 5:
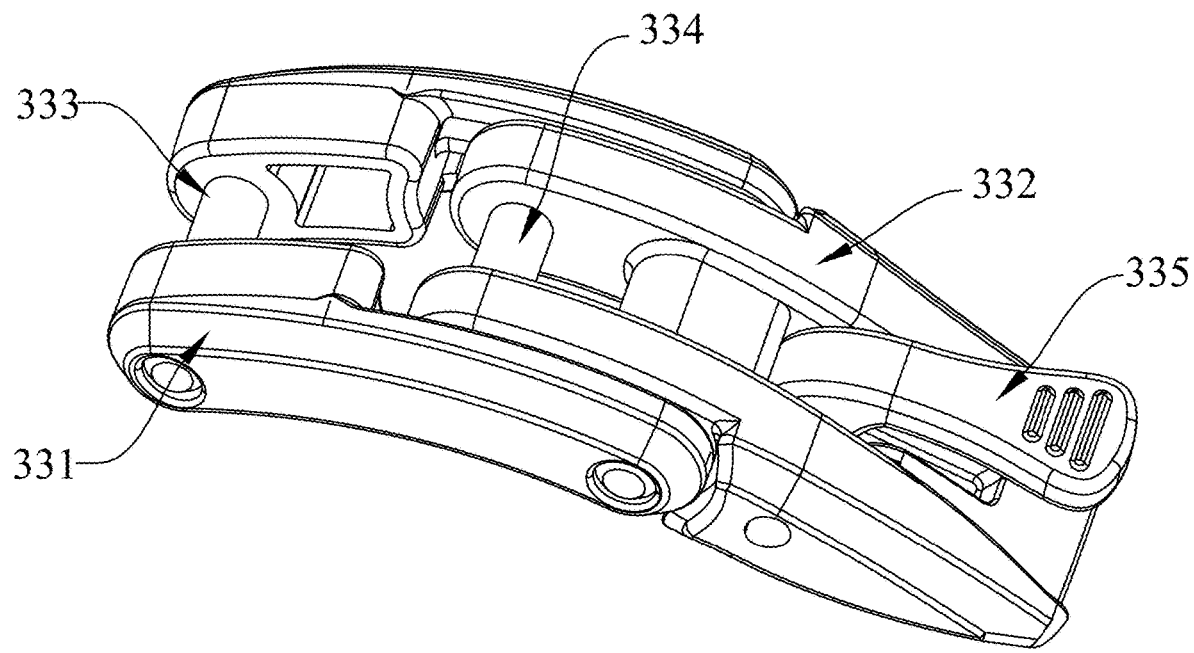
FIG. 5 is a structural schematic diagram of a locking device according to an embodiment.

1—grip; 10—connecting plate; 11—straight grip tube; 12—curved grip tube; 2—weight mounting assembly; 21—rotating shaft; 22—cam mechanism; 221—hitching part; 222—avoidance part; 223—bearing layer; 224—wear-resistant layer; 225—protruding point; 226—connecting neck; 227—connecting protrusion; 228—connecting groove; 23—weight stack; 231—notch; 232—cam groove; 233—clamping port; 3—safety lock assembly; 31—first fixing plate; 311—first mounting groove; 312—first positioning hole; 313—first adjusting hole; 314—first fixing groove; 315—first tip; 316—hook; 32—second fixing plate; 321—second mounting groove; 322—second positioning hole; 323—second adjusting hole; 324—second fixing groove; 325—second tip; 326—mounting hole; 33—locking device; 331—fixing piece; 332—wrench; 333—first lockpin; 334—second lockpin; 335—knob; 336—torsional spring; 337—clamping hook; 338—abutting groove; 34—front mounting plate; 35—rear mounting plate; 36—step shaft sleeve; 37—safety lock shell; 371—open port; 372—clamping groove; 4—base; 41—bottom support; 411—grip storage groove.

Detailed Description of the Embodiments

The present invention is described in detail below with reference to the accompanying drawings and embodiments. Each example is provided to explain the present invention instead of limiting the present invention. In fact, those skilled in the art will appreciate that modifications and variations may be made in the present invention without departing from the scope or spirit of the present invention. For example, features shown or described as one part of one embodiment may be applied to another embodiment to generate yet another embodiment. Therefore, it is expected that the present invention includes such modifications and variations that fall within the scope of the appended claims and their equivalents.

In the description of the present invention, orientation or position relationships indicated by terms "longitudinal", "transverse", "upper", "lower", "front", "rear", "left", "right", "vertical", "horizontal", "top", "bottom" and the like are orientation or position relationships shown in the drawings, and these terms are merely for facilitating description of the present invention, but not for requiring that the present invention must be constructed and operated in a specific orientation, and thus, these terms cannot be understood as a limitation to the present invention. As used in the present invention, the terms "connected", "connection" and "set" should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

The accompanying drawings show one or a plurality of examples of the present invention. The detailed description uses reference numerals and letters to refer to the features in the accompanying drawings. Similar numeral references in the drawings and description have been used to refer to the similar parts in the present invention. As used herein, the terms "first", "second" and "third" are used interchangeably to distinguish one component from another component, and are not intended to indicate the position or importance of individual components.

Figure 6:
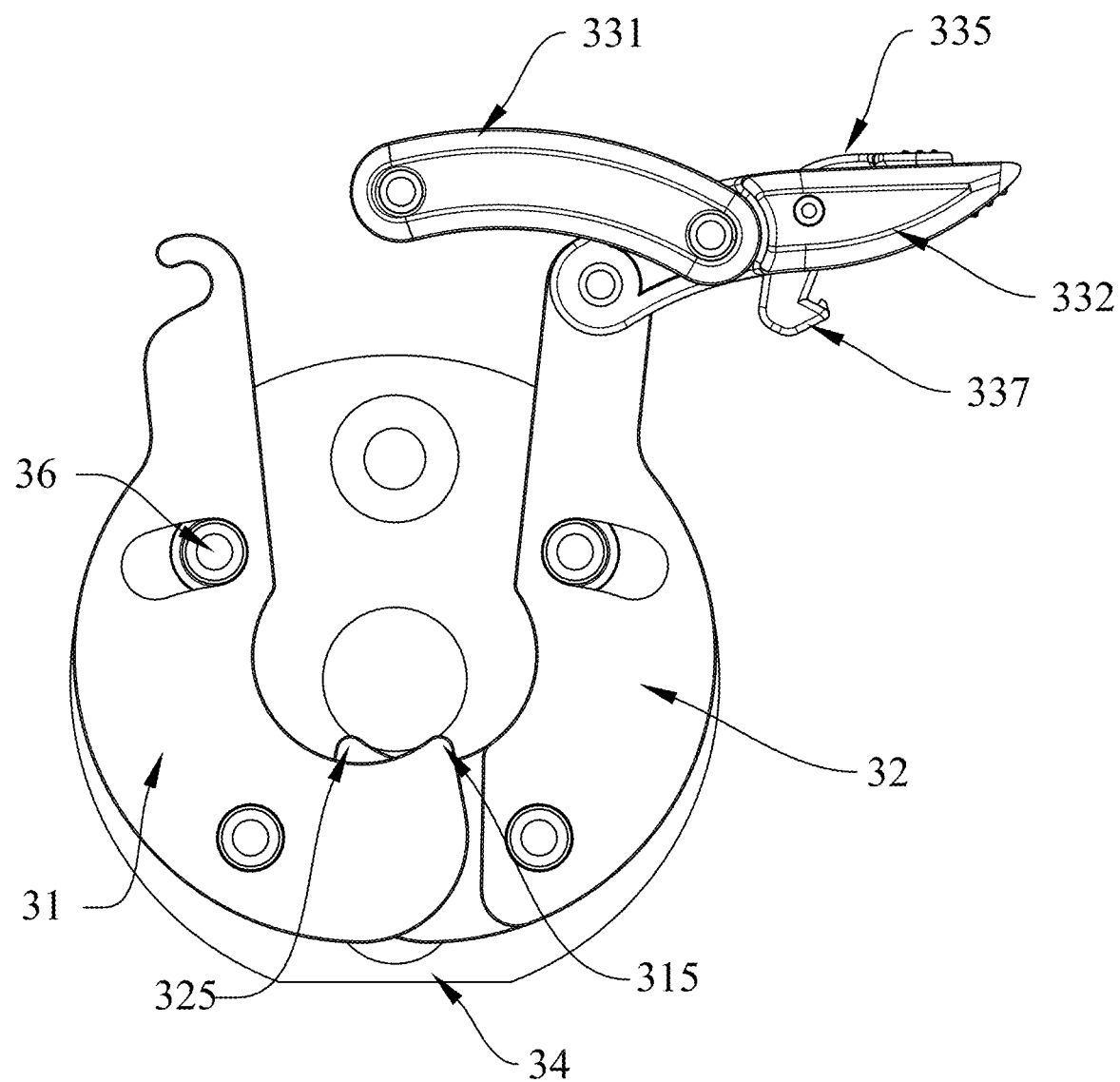
FIG. 6 is a structural schematic diagram of two fixing plates in an unlocked state according to an embodiment.

As shown in FIG. 1 to FIG. 14, an embodiment of the present invention provides multifunctional adjustable weightlifting equipment, including a grip 1 and a weight mounting assembly 2; a safety lock assembly 3 is fixedly mounted on the weight mounting assembly 2; and the grip 1 is detachably connected to the safety lock assembly 3. The safety lock assembly 3 includes a first fixing plate 31, a second fixing plate 32, and a front mounting plate 34 for mounting the first fixing plate 31 and the second fixing plate 32. A first mounting groove 311 and a second mounting groove 321 are respectively formed at lower ends of the first fixing plate 31 and the second fixing plate 32. A size of the first mounting groove 311 is matched with that of the second mounting groove 321. The first mounting groove 311 of the first fixing plate 31 and the second mounting groove 321 of the second fixing plate 32 are stacked oppositely together and then are respectively hinged with the front mounting plate 34 in a limiting manner. Specifically, a first positioning hole 312 and a second positioning hole 322 are respectively formed at the symmetrical positions of plate surfaces of the first fixing plate 31 and the second fixing plate 32; step shaft sleeves 36 are fixedly mounted on the front mounting plate 34 respectively corresponding to the positions of the first positioning hole 312 and the second positioning hole 322; and the first fixing plate 31 and the second fixing plate 32 can respectively rotate around the step shaft sleeves 36 in the first positioning hole 312 and the second positioning hole 322. To limiting the rotating angle of the first fixing plate 31 and the second fixing plate 32, a first adjusting hole 313 and a second adjusting hole 323 are respectively formed at the symmetrical positions of plate surfaces of the first fixing plate 31 and the second fixing plate 32; the first adjusting hole 313 and the second adjusting hole 323 are shaped like running tracks with two semi-circular ends; step shaft sleeves 36 are fixedly mounted on the front mounting plate 34 respectively corresponding to the positions of the first adjusting hole 313 and the second adjusting hole 323; as shown in FIG. 6, when the first fixing plate 31 and the second fixing plate 32 rotate respectively apart from each other, the upper ends of the first fixing plate 31 and the second fixing plate 32 are oppositely opened outwards, and an opening formed between the upper ends of the first fixing plate 31 and the second fixing plate 32 is gradually enlarged; and when the step shaft sleeves 36 in the first adjusting hole 313 and the second adjusting hole 323 are respectively located at the innermost ends of the first adjusting hole 313 and the second adjusting hole 323, the opening is the largest. When the first fixing plate 31 and the second fixing plate 32 rotate respectively close to each other, the upper ends of the first fixing plate 31 and the second fixing plate 32 are oppositely tightened inwards. The first fixing plate 31 is provided with an arc-shaped first fixing groove 314 located above the first mounting groove 311; the second fixing plate 32 is provided with an arc-shaped second fixing groove 324 located above the second mounting groove 321; when the first mounting groove 311 and the second mounting groove 321 are oppositely stacked together, the first fixing groove 314 and the second fixing groove 324 form a concentric arc, and a diameter of the formed arc is matched with an outer diameter of a grip tube of the grip 1; and when the upper ends of the first fixing plate 31 and the second fixing plate 32 are oppositely tightened inwards, a width of the opening formed between the upper ends of the first fixing plate 31 and the second fixing plate 32 is less than the outer diameter of the grip tube, and at this time, the grip 1 is limited between the first fixing plate 31 and the second fixing plate 32. The first fixing plate 31 is provided with a first tip 315 located on an end part of the first fixing groove 314, and the second fixing plate 32 is provided with a second tip 325 located on an end part of the second fixing groove 324. As shown in FIG. 6, when the first fixing plate 31 and the second fixing plate 32 rotate respectively apart from each other, the first tip 315 is higher than an arc edge of the second fixing groove 324, and the second tip 325 is higher than an arc edge of the first fixing groove 314. At this time, when the grip tube of the grip 1 is placed between the first fixing groove 314 and the second fixing groove 324, the grip 1 presses down the first tip 315 and the second tip 325, so that the first fixing plate 31 and the second fixing plate 32 automatically rotate and reset. A rear mounting plate 35 mounted cooperatively with the front mounting plate 34 is arranged on the plate surfaces on the other sides of the first fixing plate 31 and the second fixing plate 32; a plate surface of the rear mounting plate 35 is provided with a U-shaped opening; the rear mounting plate 35 is fixedly connected to the step shaft sleeves on the front mounting plate 34 through a bolt; and the first fixing plate 31 and the second fixing plate 32 are mounted between the front mounting plate 34 and the rear mounting plate 35. The other side of the rear mounting plate 35 is detachably connected to a safety lock shell 37; an open port 371 is formed at an edge of the safety lock shell 37; the upper ends of the first fixing plate 31 and the second fixing plate 32 pass through the open port 371; a U-shaped opening with consistent opening position corresponding to the position of the U-shaped opening in the rear mounting plate 35 is formed in a plate surface of the safety lock shell 37 and is used for the grip 1 to pass through. The safety lock shell 37 wraps the rear mounting plate 35, the first fixing plate 31, the second fixing plate 32 and the front mounting plate 34 inside.

Figure 7:
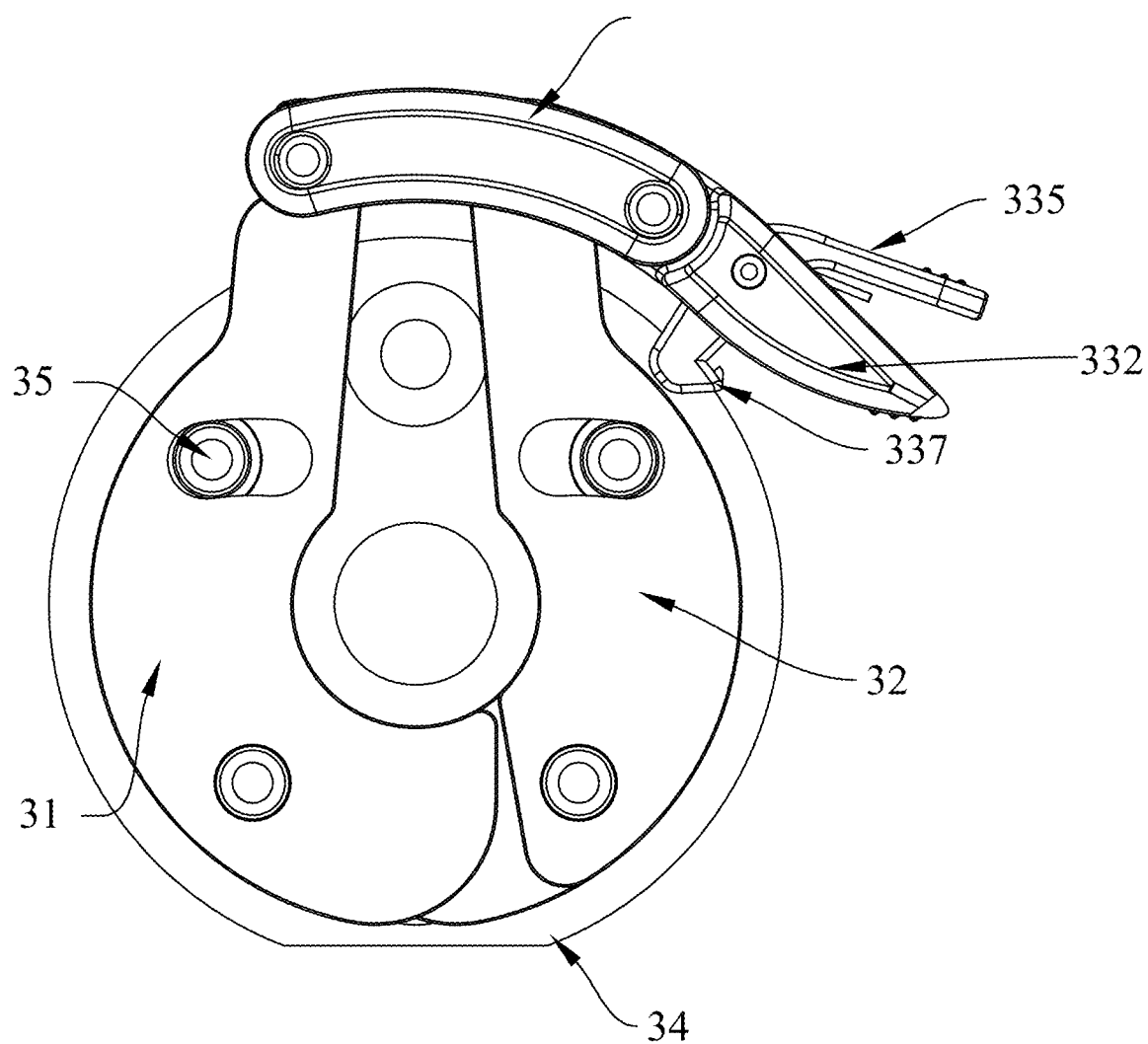
FIG. 7 is a structural schematic diagram of two fixing plates in a locked state according to an embodiment.
Figure 8:
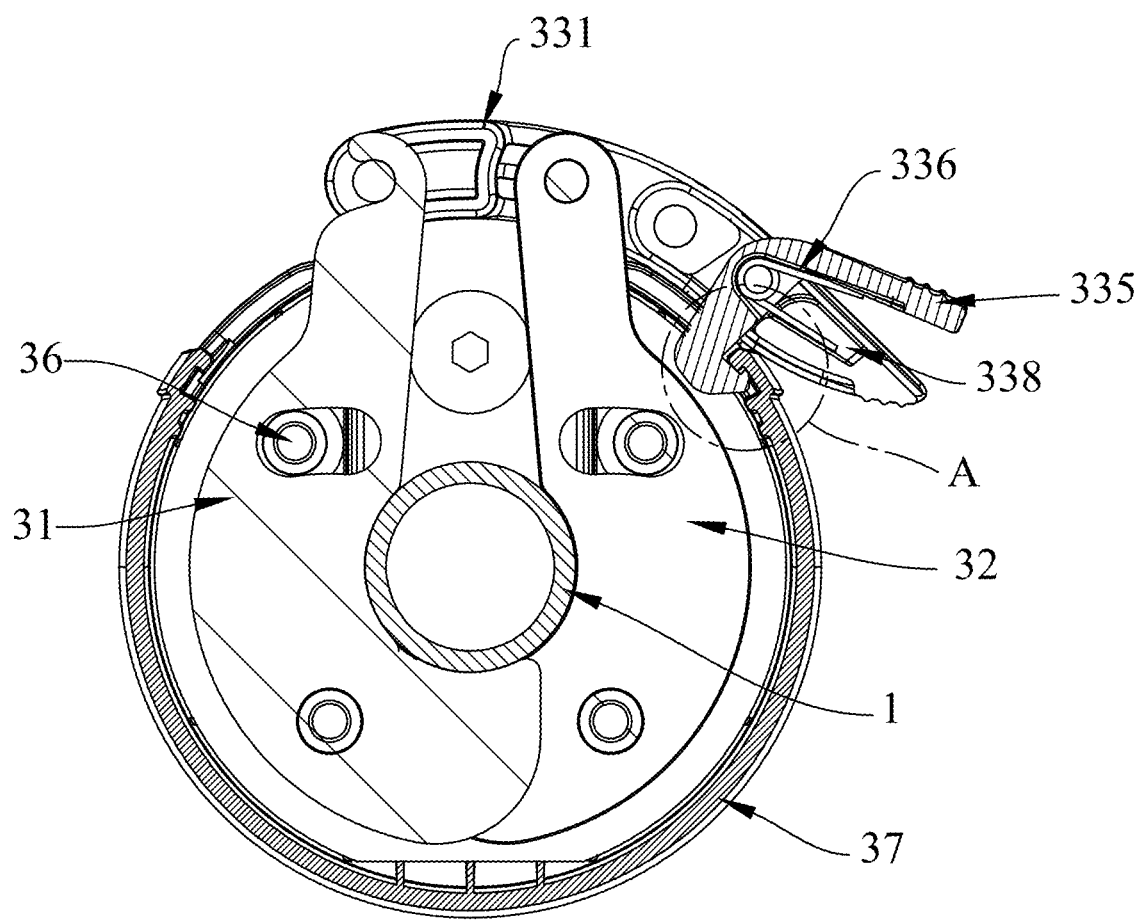
FIG. 8 is a schematic diagram of a sectional structure of a safety lock assembly in a locked state according to an embodiment.
Figure 9:
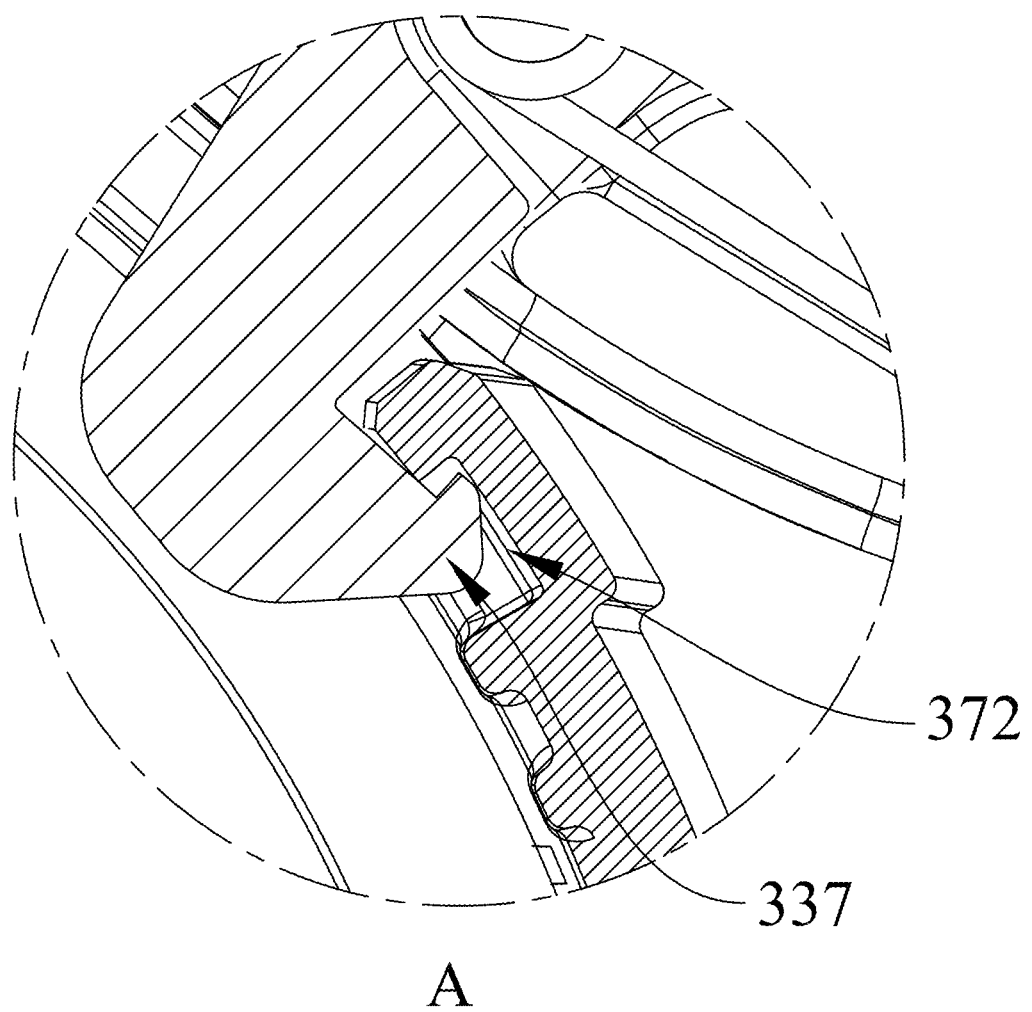
FIG. 9 is an enlarged schematic diagram of an area A in FIG. 8.
Figure 10:
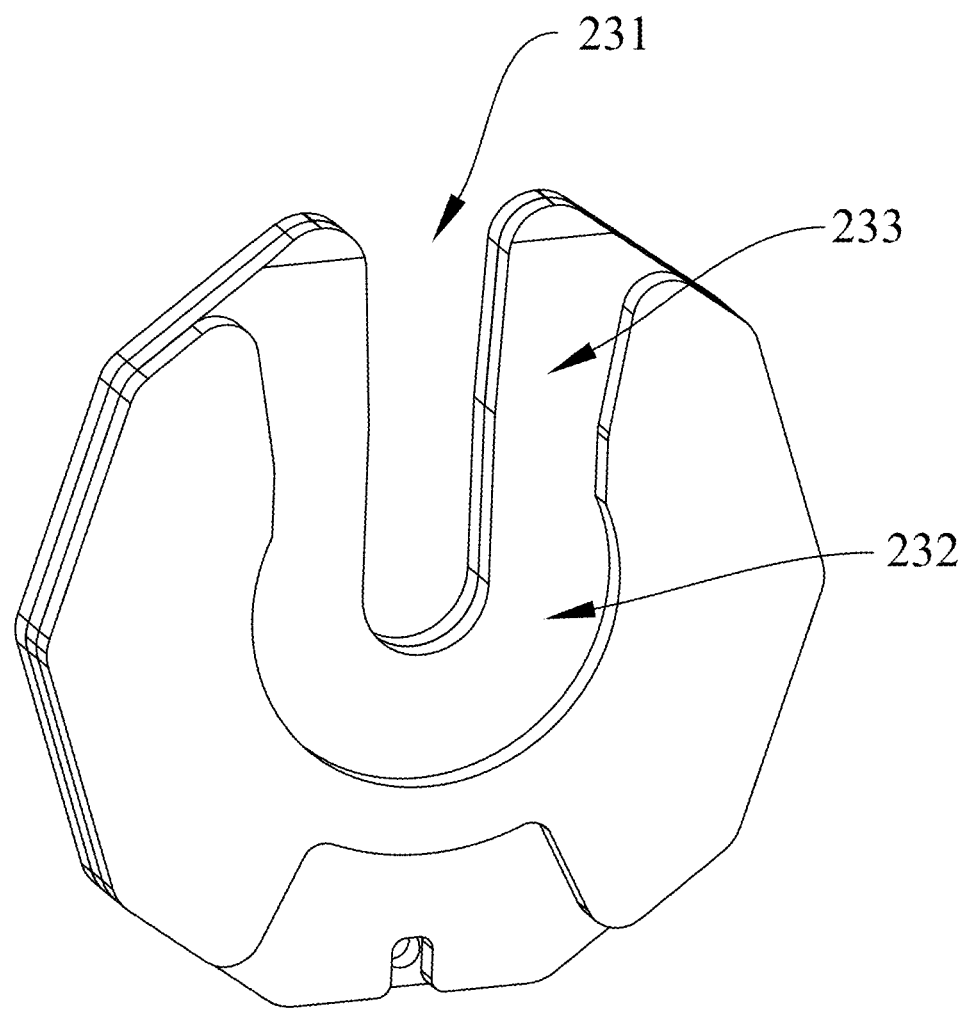
FIG. 10 is a schematic diagram of an exploded structure of a barbell according to an embodiment.
Figure 11:
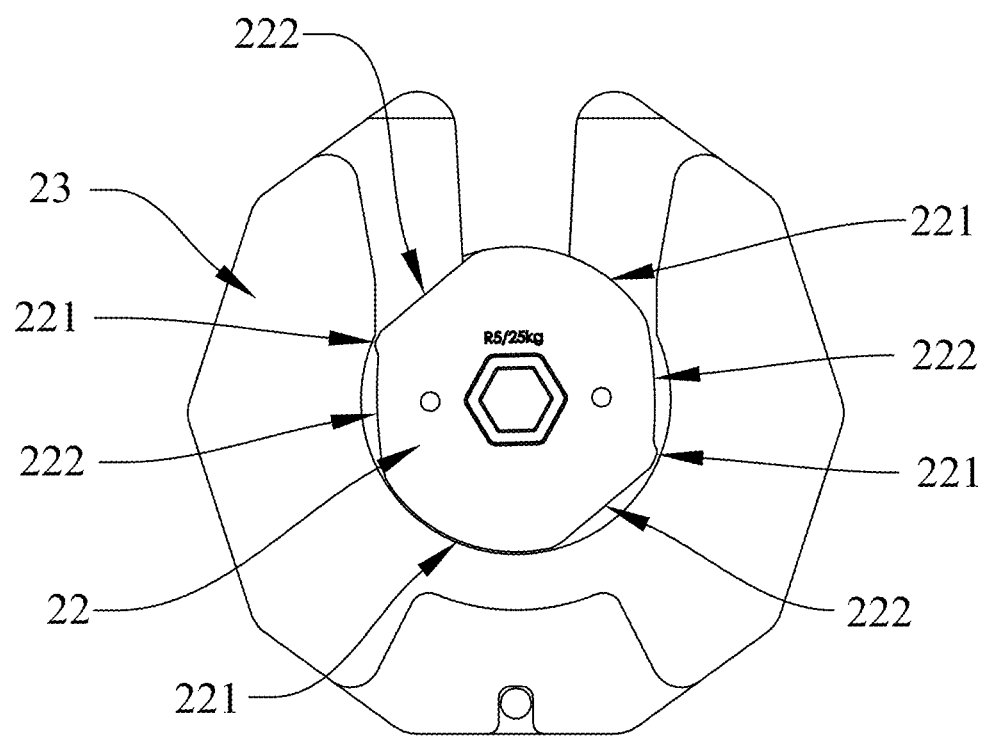
FIG. 11 is a structural schematic diagram of a weight stack according to an embodiment.
Figure 12:
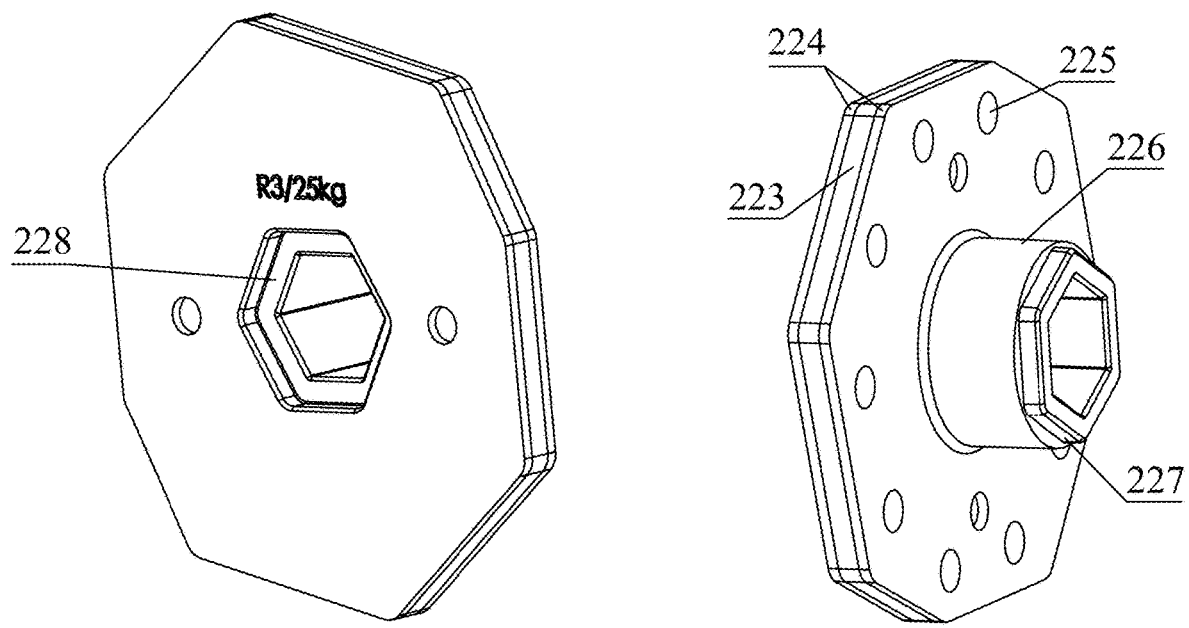
FIG. 12 is a structural schematic diagram of connection between a cam mechanism and a weight stack according to an embodiment.
Figure 13:
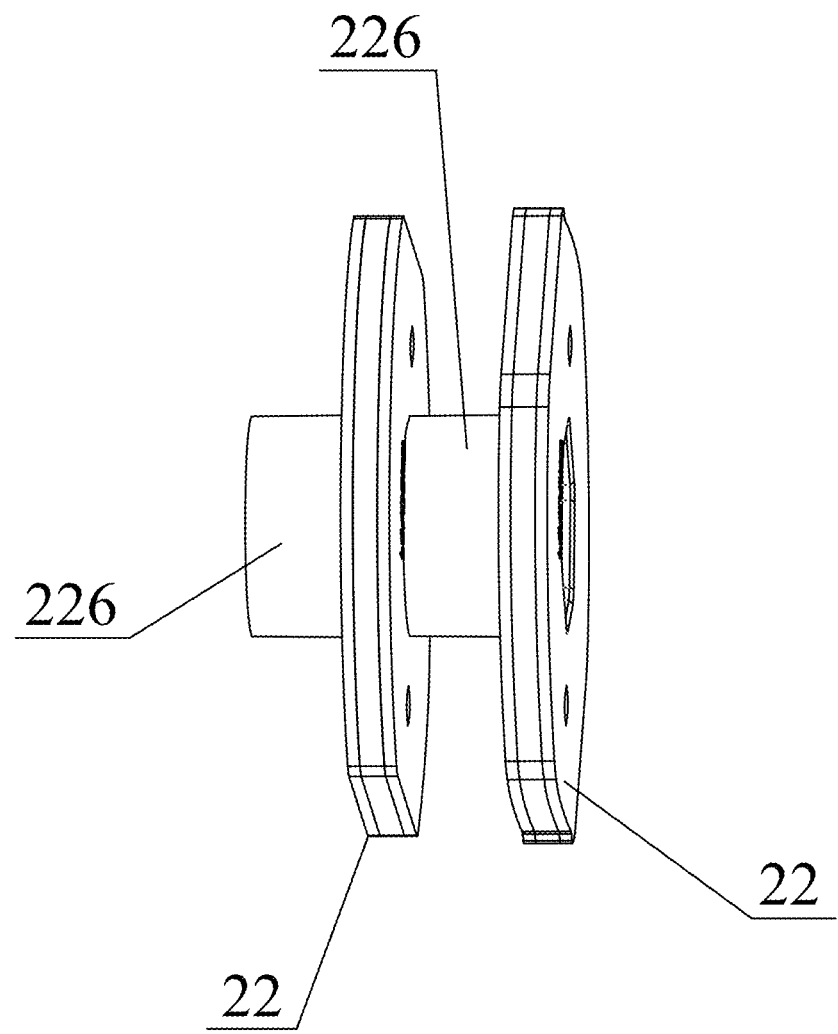
FIG. 13 is a structural schematic diagram of two sides of a cam mechanism according to an embodiment.
Figure 14:
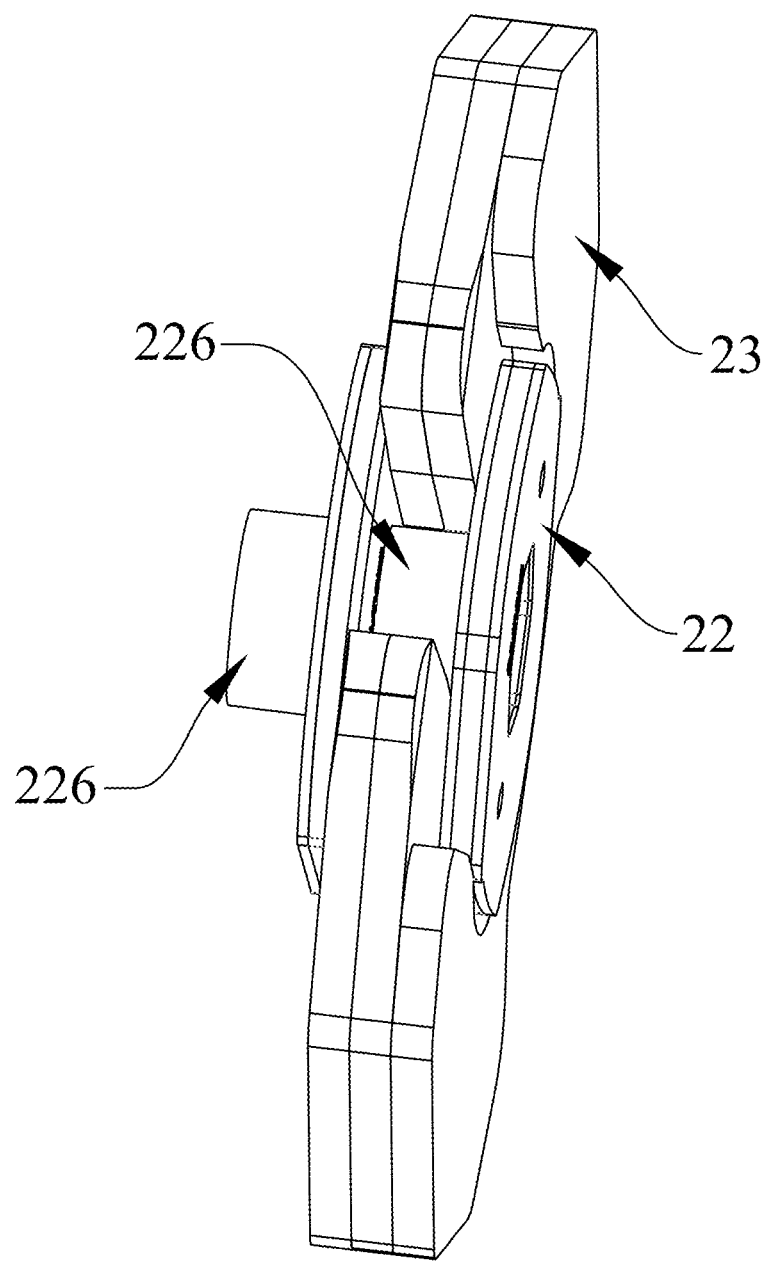
FIG. 14 is a structural schematic diagram of a connection state of two cam mechanisms according to an embodiment.
Figure 15:
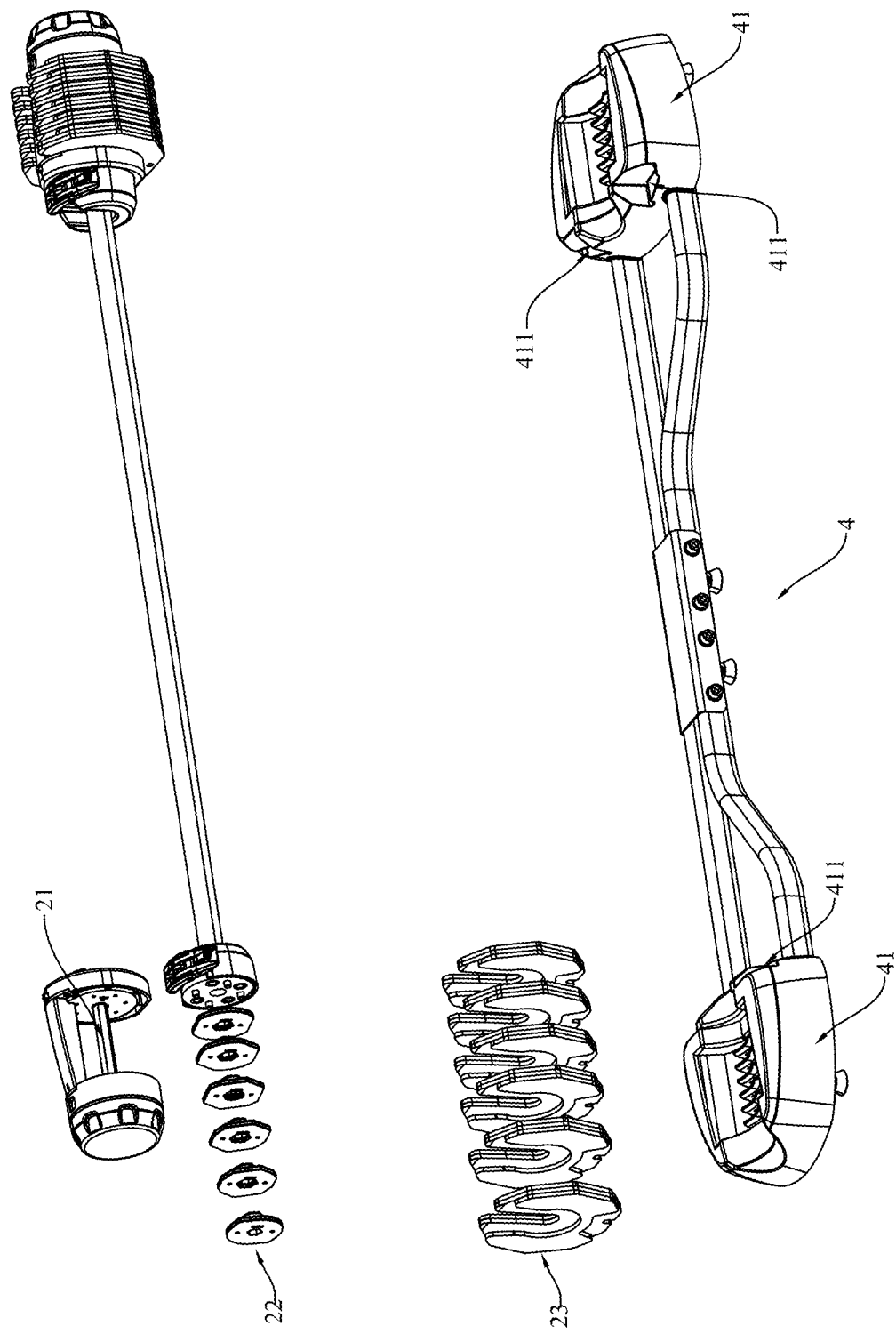
FIG. 15 is a structural schematic diagram of a mounting state of two sides of a weight stack and a cam mechanism according to an embodiment.
Figure 16:
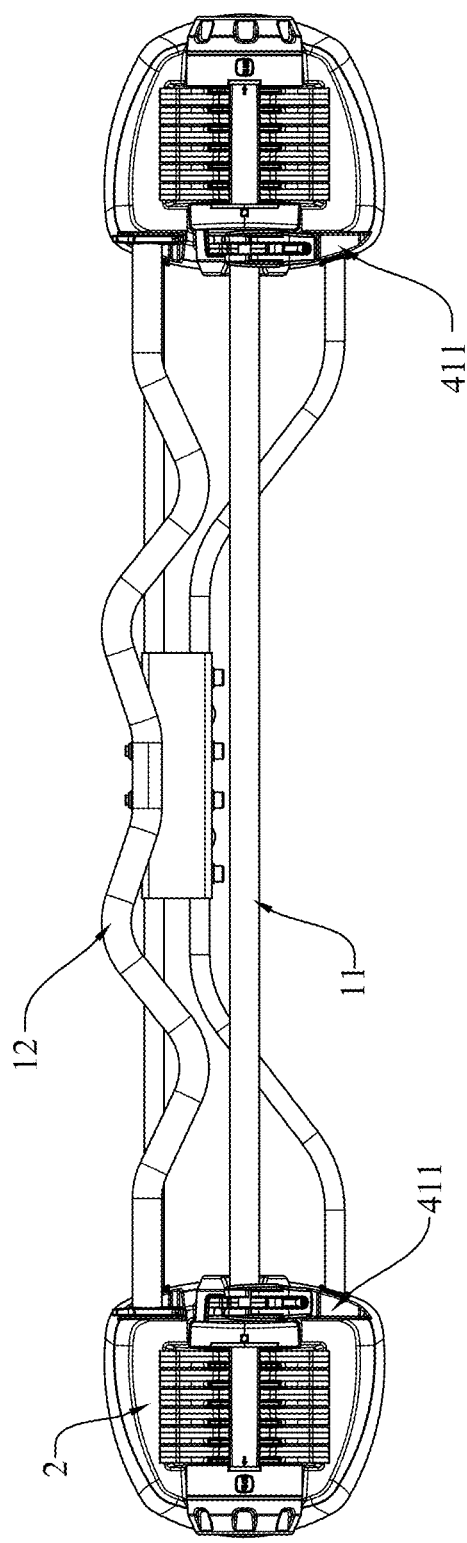
FIG. 16 is a Schematic diagram of a curved grip and a barbell assembly stored in a base according to an embodiment.

The second fixing plate 32 is hinged with a locking device 33; the locking device 33 includes a fixing piece 331 and a wrench 332; one end of the fixing piece 331 is hinged with the middle position of the wrench 332, and a first lockpin 333 is arranged at the other end of the fixing piece 331; and a second lockpin 334 is arranged at one end of the wrench 332, and the other end of the wrench 332 is a free end. Correspondingly, a mounting hole 326 is formed in a plate surface of the upper end of the second fixing plate 32, and the second lockpin 334 passes through the mounting hole 326 and then hinges the wrench 332 with the second fixing plate 32. A hook 316 is arranged on the plate surface of the upper end of the first fixing plate 31, and a size of the hook 316 is matched with that of the first lockpin 333, so that the hook 316 and the first lockpin 333 can be hitched together. As shown in FIG. 7, when the first fixing plate 31 and the second fixing plate 32 rotate close to each other to the innermost sides, the fixing piece 331 is driven by the wrench 332 to hitch the hook 316 with the first lockpin 333, so that the first fixing plate 31 and the second fixing plate 32 are fixed relatively and cannot rotate.

The locking device 33 further includes a knob 335; the knob 335 has two obtuse-angled edging strips; the knob 335 is hinged with the wrench at an intersection point of the two edging strips; a clamping hook 337 is arranged at an end part of the edging strip at a lower end of the knob 335; correspondingly, a clamping groove 372 matched with the clamping hook 337 is formed in a side wall of the safety lock shell 37; and when the clamping hook 337 is in clamping connection with the clamping groove 372, the knob 335 fixes the wrench 332 and the wrench 332 is non-rotatable. A torsional spring 336 is mounted on the knob 335; the wrench 332 is provided with an abutting groove 338 corresponding to the mounting position of the torsional 336; one end of the torsional spring 336 abuts against the abutting groove 338, and the other end of the torsional spring 336 abuts against an inner surface of a free end of the knob 335; when no external force is applied to an outer side of the knob 335, the clamping groove 337 and the clamping groove 372 maintain a clamping connection state under the action of an elastic force of the torsional spring 336, and at this time, the safety lock is in a locked state and the grip 1 cannot be replaced; and when the free end of the knob 335 is pressed down, the clamping groove 337 is not in clamping connection with the clamping groove 372, the wrench 332 can be wrenched upwards to connect the fixing piece 331 with the first fixing plate 31, and at this time, the safety lock is in an unlocked state and the grip 1 can be replaced.

The grip 1 includes a grip tube, and connecting plates 10 fixedly connected to two ends of the grip tube; the connecting plates 10 are in sleeving connection with outer sides of end parts of the grip tube and are fixedly connected; and when the grip tube is fixed between the first fixing plate 31 and the second fixing plate 32, the connecting plates 10 are accommodated between the front mounting plate 34, and the first fixing plate 31 and the second fixing plate 32, thereby preventing the grip tube from sliding out of the safety lock assembly 3. To meet different exercise requirements, the grip tube includes a straight grip tube 11 and a curved grip tube 12; and two ends of the straight grip tube 11 and the curved grip tube 12 are fixedly connected to the connecting plates 10, respectively. When different grips are required to be used, the grips can be replaced rapidly through the safety lock assembly 3, which is convenient and safe.

The weight mounting assembly 2 includes a rotating shaft 21; and six cam mechanisms 22 are sleeved on the rotating shaft 21 in a non-rotatable manner and configured to hitch the weight stack 23. The cam mechanisms 22 of the weight mounting assemblies 2 on two sides are arranged symmetrically; two cam mechanisms 22 at the symmetrical positions of the two sides have the same shape and size; each pair of cam mechanisms 22 have several hitching parts 221 and avoidance parts 222 with different angles; each pair of hitching parts 221 are arranged symmetrically about the center of the cam mechanism 22; each pair of avoidance parts 222 are arranged symmetrically about the center of the cam mechanism 22; and when the hitching part 221 and the weight stack 23 are hitched, the weight stack 23 is hitched on the rotating shaft 21 through the mechanisms 22. Each pair of cam mechanisms 22 has several hitching parts 221 and avoidance parts 222 with different angles. When different cam mechanisms 22 are sequentially sleeved on the rotating shaft 21, different numbers of weight stacks 23 can be hitched by rotating at different angles, thereby realizing weight adjustment.

A notch 231 for the connecting neck 226 to enter is formed in the middle of the weight stack 23; a cam groove 232 is formed in a surface, located on an outer side of the notch 231, of one side of the weight stack 23; an open clamping port 233 is formed at an upper edge of the cam groove 232 and configured to accommodate the cam mechanism 22 and hitch the cam mechanism 22 and the weight stack 23. The section of the cam groove 232 is of a partial circular structure larger than half a circle; a maximum diameter width of the avoidance part 222 of the cam mechanism 22 is less than a minimum width of the clamping port 233; and when the avoidance part 222 is located at the opening of the cam groove 232 and the cam mechanism 22 is lifted upwards, the cam mechanism 22 is unhitched with the weight stack 23. A maximum diameter width of each pair of hitching parts 221 of the cam mechanisms 22 is greater than a minimum width of the clamping port 233. When one pair of hitching parts 221 are located at the clamping port 233 and the cam mechanism 22 is lifted upwards, the cam mechanism 22 is in clamping connection with the weight stack 23.

When the cam mechanism 22 on the rotating shaft 21 rotatably hitches different numbers of weight stacks 23, the mutual friction between the cam mechanism 22 and the weight stacks 23 will cause wear between the weight stacks 23 and the cam mechanism 22. Serious wear will cause unstable connection between the cam mechanism 22 and the weight stack 23, and the weight stack 23 will fall off. To reduce the wear phenomenon, further, the cam mechanism 22 further includes a bearing layer 223; the bearing layer 223 is made of a galvanized iron plate and configured to be hitched with the weight stacks 23; wear-resistant layers 224 are respectively arranged on two sides of the bearing layer 223; the wear-resistant layers 224 are made of plastic; and when friction occurs between the wear-resistant layers 224 and the weight stacks 23, the surfaces of the weight stacks 23 are not damaged. A connecting neck 226 is fixedly connected or integrally formed at the center position of the wear-resistant layer 224 on one side of the bearing layer 223, and a polygonal connecting protrusion 227 is arranged at a free end of the connecting neck 226; and the wear-resistant layer 224 on the other side of the bearing layer 223 is provided with a connecting groove 228 of which a shape and a size are matched with those of the connecting protrusion 227. When the connecting protrusion 227 at the free end of the connecting neck 226 of one cam mechanism 22 is connected to the connecting groove 228 of the other cam mechanism 22, the connecting neck 226 separates the adjacent two cam mechanisms 22 from each other to provide a mounting space for mounting the weight stack 23.

A plurality of protruding points 225 are arranged on an outer surface of the wear-resistant layer 224 on one side, on which the connecting neck 226 is arranged, of the cam mechanism 22. When the connecting neck 226 of the cam mechanism 22 enters the weight stack 23 from the notch 231, the protruding points 225 are in contact with the interior of the cam groove 232 and configured to prevent friction between the bearing layer 223 and the weight stack 23. In this embodiment, the protruding points 225 are not limited to protruding point structures, or may have a structure capable of protruding out of the outer surface of the wear-resistant layer 224, such as a protruding strip and a protruding ring. A depth of the cam groove 232 is less than the sum of a thickness of the bearing layer 223 of the cam mechanism 22 and thicknesses of the wear-resistant layers 225 on the two sides of the bearing layer. When the cam mechanism 22 is located inside the cam groove 232, one side, on which the protruding point 225 is not arranged, of the cam mechanism 22 is higher than the cam groove 232, thereby effectively preventing friction between two weight stacks 23.

The present invention further discloses a base 4, where a bottom support 41 is arranged on each of two ends of the base 4 and configured to place the weight stack 23; two pairs of grip storage grooves 411 are formed at the symmetrical positions of upper surfaces of the bottom supports 41 on two sides and are configured to support two ends of a grip 1 and store the grip 1, thereby facilitating switching between different grips 1.

From the above description, it can be seen that the above embodiments of the present invention achieve the following technical effects:
1. the safety lock assembly 3 is arranged between the weight mounting assembly 2 and the grip 1, so that the grip 1 can be replaced rapidly, the replacement process is safe, the event that the weight stack 23 falls or topples is avoided, and the use is safer.
2. The locking device 33 is arranged in the safety lock assembly 3, the wrench 332 can be unlocked after the knob 335 is pressed, and the position relationship between the first fixing plate 31 and the second fixing plate 32 is released by the wrench 332.
3. The weight mounting assembly 2 is provided with multiple pairs of hitching parts and avoidance parts with different angles, and the rotating shaft 21 is rotated at different angles to hitch different numbers of weight stacks 23, so that weight adjustment is achieved, and the adjustment process is simple, convenient and very safe.
4. The wear-resistant layers 224 are arranged on two sides of the cam mechanism 22 and can effectively avoid wear between the cam mechanism 22 and the weight stack 23.
5. The grip storage groove 411 is formed above the base 4 and configured to store idle grips, thereby facilitating arrangement and storage.

Compared with the prior art, the multifunctional adjustable weightlifting equipment provided by the present invention can replace the grip safely and efficiently, can adjust weight safely and conveniently, can effectively prevent wear between the cam mechanism and the weight stack, can store a plurality of grips simultaneously, and is convenient to use and more durable.

The above is merely illustrative of the preferred embodiments of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

The invention claimed is:
1. Multifunctional adjustable weightlifting equipment, comprising:
   a grip, wherein two ends of the grip are each fixedly connected to a connecting plate;
   a weight mounting assembly comprising a rotating shaft and at least one cam mechanism, wherein the at least one cam mechanism is sleeved on the rotating shaft in a non-rotatable manner and configured to hitch a weight of a weight stack, and each of the at least one cam mechanism has at least two pairs of hitching parts and avoidance parts with different angles; and
   a safety lock assembly arranged between the grip and the weight mounting assembly, wherein one side of the safety lock assembly is fixedly connected to the weight mounting assembly, and an end part of the grip is in detachable clamping connection with the safety lock assembly; and
   wherein the safety lock assembly comprises:
      a first fixing plate, an open first fixing groove being formed at a middle position of the first fixing plate, and a lower end of the first fixing plate being hinged with the weight mounting assembly; and
      a second fixing plate, an open second fixing groove being formed at a middle position of the second fixing plate, the second fixing plate and the first fixing plate being mounted oppositely, and a lower end of the second fixing plate being hinged with the weight mounting assembly,
      wherein when the open first fixing groove is directly opposite to the open second fixing groove, a shape formed thereby is matched with a shape of the end part of the grip, and when the end part of the grip is in clamping connection with the safety lock assembly, the connecting plates is limited inside the safety lock assembly.

2. The multifunctional adjustable weightlifting equipment according to claim 1,
   wherein the safety lock assembly further comprises a locking device, the locking device detachably connects an upper end of the first fixing plate with an upper end of the second fixing plate.

3. The multifunctional adjustable weightlifting equipment according to claim 2,
   wherein the safety lock assembly further comprises a safety lock shell, the first fixing plate and the second fixing plate are mounted inside the safety lock shell, an open port is formed at an edge of the safety lock shell, and the upper ends of the first fixing plate and the second fixing plate pass through the open port.

4. The multifunctional adjustable weightlifting equipment according to claim 3, wherein the locking device further comprises:
   a knob having two obtuse-angled edging strips, the knob being hinged with the wrench at an intersection point of the two edging strips;
   a clamping hook arranged at an end part of the edging strip at a lower end of the knob; and
   a clamping groove matched with the clamping hook, formed in a side wall of the safety lock shell,
   wherein when the clamping hook is in clamping connection with the clamping groove, the wrench is non-rotatable.

5. The multifunctional adjustable weightlifting equipment according to claim 4,
   wherein a torsional spring is further mounted on the knob, the wrench is provided with an abutting groove corresponding to a mounting position of the torsional spring, one end of the torsional spring abuts against the abutting groove, and another end of the torsional spring abuts against an inner surface of a free end of the knob.

6. The multifunctional adjustable weightlifting equipment according to claim 2,
wherein the locking device comprises a fixing piece and a wrench, one end of the fixing piece is hinged with a middle position of the wrench, a first lockpin is arranged at another end of the fixing piece, and a second lockpin is arranged at one end of the wrench.

7. The multifunctional adjustable weightlifting equipment according to claim 6, wherein;
a hook is arranged on a plate surface of the upper end of the first fixing plate, and a size of the hook is matched with a size of the first lockpin, so that the hook is capable of being hitched with the first lockpin,
a mounting hole is formed in a plate surface of the upper end of the second fixing plate, and the second lockpin sequentially passes through the wrench and the mounting hole and then hinges the wrench with the second fixing plate.

8. The multifunctional adjustable weightlifting equipment according to claim 1, wherein each weight of the weight stack comprises: a notch formed in the middle of the weight for accommodating the rotating shaft, a cam groove, formed in a surface located on an outer side of the notch of one side of the weight, and an open clamping port formed at an upper edge of the cam groove and configured to accommodate the at least one cam mechanism and hitch the at least one cam mechanism and the weight.

9. The multifunctional adjustable weightlifting equipment according to claim 8, wherein the at least one cam mechanism comprises a bearing layer for being hitched with the weight of the weight stack, and wear-resistant layers respectively arranged on two sides of the bearing layer.

10. The multifunctional adjustable weightlifting equipment according to claim 9, wherein a connecting neck is fixedly connected or integrally formed at the center position of the wear-resistant layer on one side of the bearing layer, and a polygonal connecting protrusion is arranged at a free end of the connecting neck, and the wear-resistant layer on another other side of the bearing layer is provided with a connecting groove having a shape and a size matched with those of the connecting protrusion.

11. The multifunctional adjustable weightlifting equipment according to claim 8, wherein a maximum diameter width of each pair of hitching parts of the at least one cam mechanism is greater than a minimum width of the clamping port, and a maximum diameter width of each pair of avoidance parts is less than the minimum width of the clamping port.

12. The multifunctional adjustable weightlifting equipment according to claim 1, further comprising: a base having a bottom support arranged on each of two ends of the base; two pairs of grip storage grooves formed at symmetrical positions on upper surfaces of the bottom supports on two sides and configured to support the two ends of the grip.

* * * * *